United States Patent
Marupaduga (10) Patent No.: US 9,615,300 B1
(45) Date of Patent: Apr. 4, 2017

(54) WIRELESS ACCESS NODE AND HAND-OFF METHOD FOR HANDING-OFF A WCD TO A RELAY NODE

(71) Applicant: Sprint Communications Company L.P., Overland Park, KS (US)

(72) Inventor: Sreekar Marupaduga, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 128 days.

(21) Appl. No.: 14/090,388

(22) Filed: Nov. 26, 2013

(51) Int. Cl.
*H04W 36/30* (2009.01)
*H04B 7/155* (2006.01)

(52) U.S. Cl.
CPC ........ *H04W 36/30* (2013.01); *H04B 7/15557* (2013.01)

(58) Field of Classification Search
CPC ............................ H04W 36/30; H04B 7/15557
See application file for complete search history.

(56) References Cited

U.S. PATENT DOCUMENTS

| | | | |
|---|---|---|---|
| 6,138,021 A * | 10/2000 | Arrington, Jr. | .... H04B 7/18541 342/357.52 |
| 8,385,264 B2 | 2/2013 | Baldemair et al. | |
| 2008/0137581 A1 * | 6/2008 | Doppler et al. | ............... 370/315 |
| 2010/0246534 A1 * | 9/2010 | Vargantwar et al. | ......... 370/332 |
| 2011/0003545 A1 | 1/2011 | Vainikka et al. | |
| 2012/0159279 A1 | 6/2012 | Braithwaite | |
| 2013/0023265 A1 * | 1/2013 | Swaminathan | ..... H04W 76/027 455/423 |
| 2014/0315555 A1 * | 10/2014 | Zhang et al. | ..... H04W 36/0094 455/437 |
| 2015/0092746 A1 * | 4/2015 | Jang et al. | .................... 370/331 |

* cited by examiner

*Primary Examiner* — Hoon J Chung
*Assistant Examiner* — Zhensheng Zhang (57) ABSTRACT

A wireless access node and method for handing-off of a wireless communication device (WCD) to a relay node are provided. The wireless access node in one example includes a communication interface configured to exchange communications between the wireless access node and the WCD and a processing system coupled to the communication interface. The processing system is configured to determine that a hand-off of the WCD is imminent, if the hand-off is imminent, determine whether the WCD is receiving streaming media, if the hand-off is imminent, determine whether the WCD is located to hand-off to a decode-and-forward relay device of the wireless network, and if the WCD is about to hand-off to a decode-and-forward relay device and if the WCD is receiving streaming media, then extend a hand-off criteria in order to delay hand-off of the WCD to the decode-and-forward relay device.

18 Claims, 6 Drawing Sheets

WIRELESS ACCESS NODE AND HAND-OFF METHOD FOR HANDING-OFF A WCD TO A RELAY NODE

TECHNICAL BACKGROUND

A wireless communication device (WCD) can move between nodes of a wireless network. As a WCD moves away from a current wireless access node of the wireless network, the WCD can be handed-off to another, target node of the wireless network. As a result, the WCD can continue exchanging communications with the wireless network.

However, depending on the target node the WCD is to be handed off to, the WCD can experience difficulty in exchanging communications. If the target node comprises a decode-and-forward relay node, the WCD can experience latency problems if the WCD is exchanging streaming media with the wireless network.

OVERVIEW

A wireless access node and method for handing-off of a wireless communication device (WCD) to a relay node are provided. The wireless access node in one example includes a communication interface configured to exchange communications between the wireless access node and the WCD and a processing system coupled to the communication interface. The processing system is configured to determine that a hand-off of the WCD is imminent, if the hand-off is imminent, determine whether the WCD is receiving streaming media, if the hand-off is imminent, determine whether the WCD is located to hand-off to a decode-and-forward relay device of the wireless network, and if the WCD is about to hand-off to a decode-and-forward relay device and if the WCD is receiving streaming media, then extend a hand-off criteria in order to delay hand-off of the WCD to the decode-and-forward relay device.

DETAILED DESCRIPTION

Figure 1:
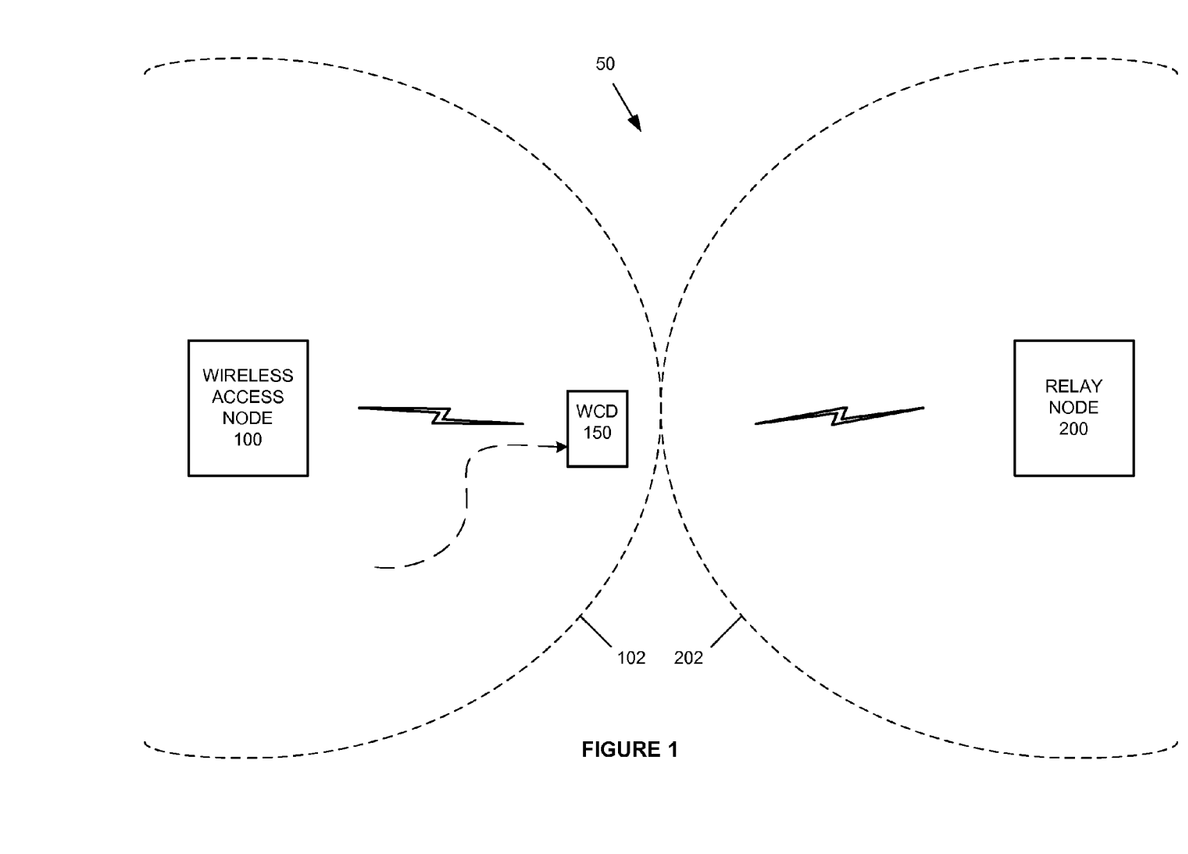
FIG. 1 shows a wireless communication device (WCD) approaching hand-off from a wireless access node to a relay node.

FIG. 1 shows a wireless communication device (WCD) 150 approaching hand-off from a wireless access node 100 to a relay node 200. The WCD 150 is currently within a cell 102 of the wireless access node 100 and is currently registered to the wireless access node 100. It can be seen from the figure that the WCD 150 is also close to the edge of the cell 202 generated by the relay node 200. As the WCD 150 approaches an edge of the cell 102, a hand-off may occur.

The relay node 200 can comprise a store-and-forward relay or a decode-and-forward relay. In a store-and-forward relay, a received communication is stored by the store-and-forward relay and then is forwarded by the relay. In a decode-and-forward relay, in contrast, the received communication is decoded, then is reconstructed from the decoded communication before being forwarded by the decode-and-forward relay. Consequently, a decode-and-forward relay will add latency to the received communication. The latency will negatively affect the relayed communication if the received communication is streaming media, digital voice, or a digital communication that is exchanged according to a Voice Over LTE (VOLTE) communication protocol, for example.

If the wireless access node 100 determines that a hand-off of the WCD 150 is imminent, and determines that the relay node 200 comprises a decode-and-forward relay and not a store-and-forward relay, then the wireless access node 100 delays a hand-off of the WCD 150. The hand-off is delayed in order to prevent handing-off the WCD 150 too soon.

The delay of the hand-off may in some cases make a hand-off unnecessary, such as if the WCD 150 changes direction of travel, wherein the WCD 150 may not need to be handed-off. The delay of the hand-off may in some cases enable the wireless access node 100 to find a different target node to hand-off to, wherein the WCD 150 may not need to hand-off to a relay node 200. Consequently, delaying the hand-off can prevent ping-ponging of the WCD 150, wherein the WCD 150 moves around in a region at the edges of the cells 102 and 202 and could be handed-off in a back-and-forth fashion between the wireless access node 100 and the relay node 200.

Figure 2:
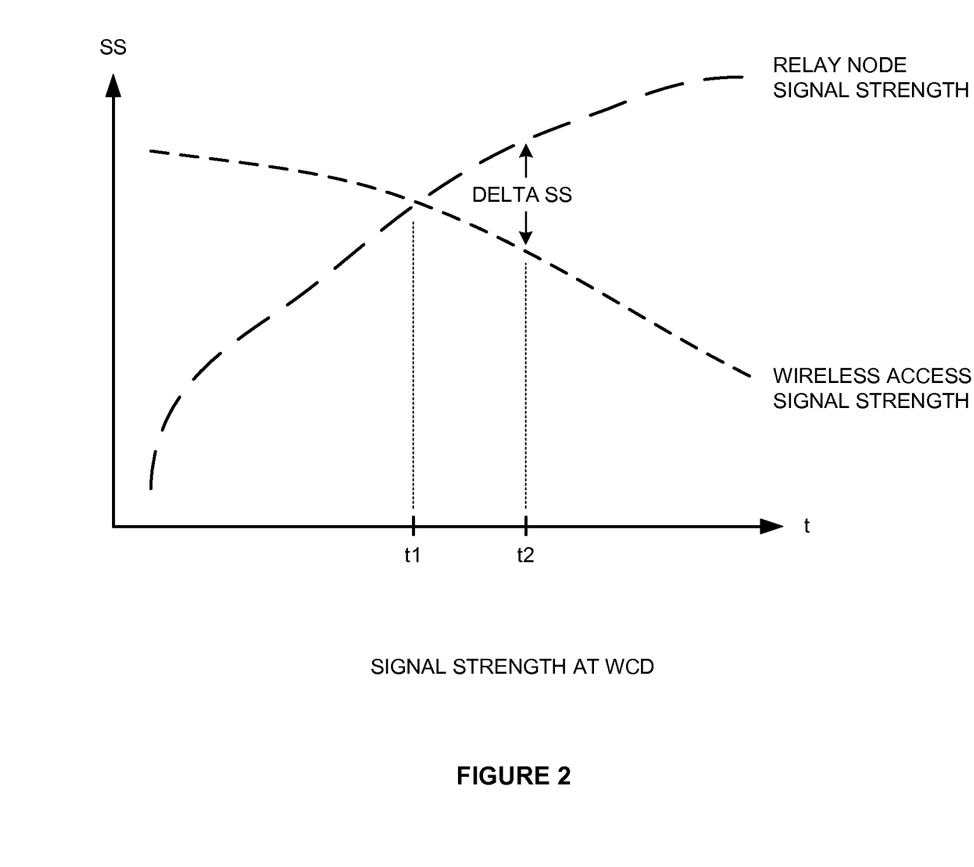
FIG. 2 shows a graph of a wireless access node signal strength (SS) versus a relay node SS.

FIG. 2 shows a graph of a wireless access node signal strength (SS) versus a relay node SS. The vertical axis depicts SS amplitude and the horizontal axis depicts time (t). The figure represents movement of the WCD 150 in the example of FIG. 1, where the WCD 150 is moving toward the right. As the WCD 150 moves away from the wireless access node 100, the wireless access node SS decreases, as can be seen from the graph. As the WCD 150 moves toward the relay node 200, the relay node SS increases. It can be seen that at time t1, the wireless access node SS is equal to the relay node SS. At time t2, the wireless access node SS is noticeably smaller in amplitude than the relay node SS.

The hand-off of the WCD 150 to the relay node 200 could occur at time t1. However, if the hand-off is delay to some point in time after the time t1, there may be a much smaller chance that the WCD 150 will ping-pong and repeatedly hand-off back-and-forth between the wireless access node 100 and the relay node 200. In some examples, the hand-off timer can be loaded with a predetermined hand-off delay that will cause the hand-off to occur at time t2 (assuming that the wireless access node SS and the relay node SS continue to change, an example of which is shown in the graph).

Figure 3:
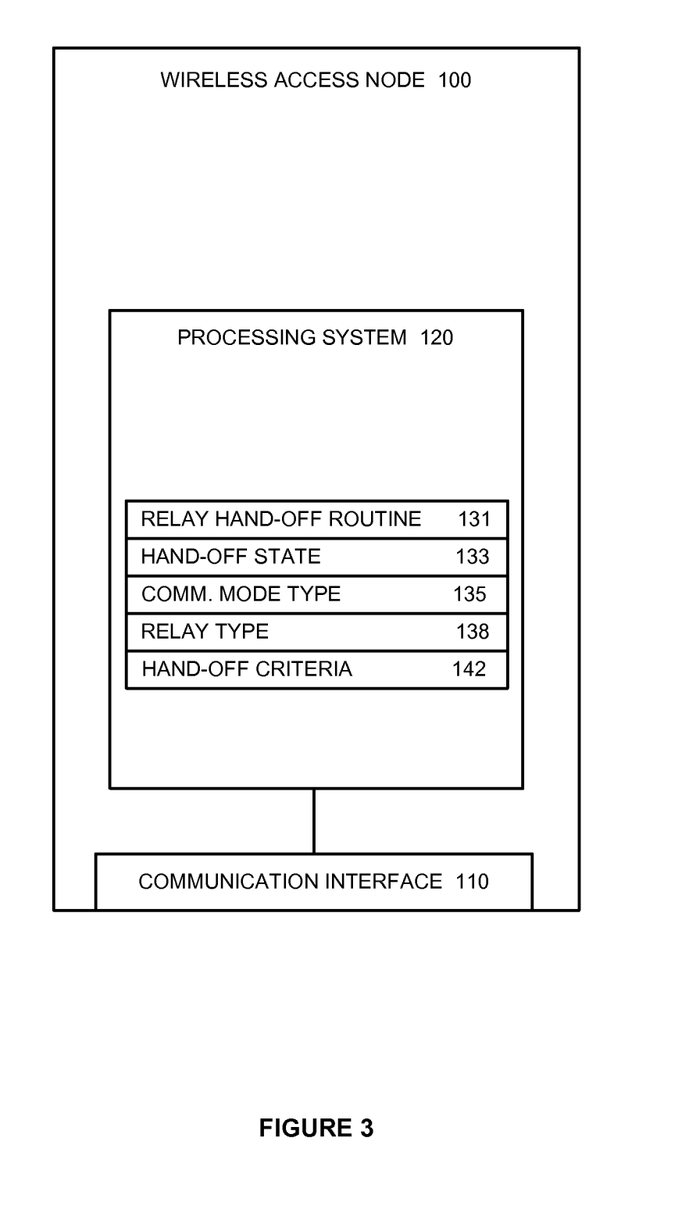
FIG. 3 shows an exemplary wireless access node configured to perform a hand-off of a WCD to a relay node.

FIG. 3 shows an exemplary wireless access node 100 configured to perform a hand-off of the WCD 300 to the relay node 200. The wireless access node 100 is configured to detect a relay type and take hand-off actions depending on whether the relay node 200 comprises a store-and-forward relay or a decode-and-forward relay.

The wireless access node 100 includes a communication interface 110 and a processing system 120, among other components. The communication interface 110 is configured to exchange communications between the wireless access node 100, the WCD 150, and the relay node 200, among others.

The processing system 120 is coupled to the communication interface 110. The processing system 120 is configured to execute software or programming that controls operation of the wireless access node 100, along with data and values needed for operation. In the example shown, the processing system 120 includes a relay hand-off routine 131, a hand-off state 133, a communication mode state 135, a relay type 138, and a hand-off criteria 142.

The relay hand-off routine 131 performs a hand-off procedure wherein the wireless access node 100 hands-off the WCD 150 to a relay, such as the relay node 200. The relay hand-off routine 131 mitigates communication latency if a hand-off is to be performed to a relay node.

The hand-off state 133 indicates whether a hand-off of the WCD 150 is imminent. The hand-off state 133 can be set to true if a hand-off is imminent. It should be understood that the wireless access node 100 can include a hand-off state 133 for each WCD of multiple WCDs within the wireless access node 100.

The communication mode type 135 indicates whether the WCD 150 is operating in a communication mode that will likely experience problematic levels of latency and delay if handed-off to a decode-and-forward type relay node. The communication mode type 135 can be set to true if the WCD 150 is operating in a communication mode such as streaming media, digital voice, or operation in a Voice Over LTE (VOLTE) communication protocol. It should be understood that the wireless access node 100 can include a communication mode type 135 for each WCD of multiple WCDs within the wireless access node 100.

The relay type 138 indicates whether the relay node 200 comprises a store-and-forward relay or comprises a decode-and-forward relay. The relay type 138 can be set to a decode-type state when the relay node 200 comprises a decode-and-forward relay. Conversely, the relay type 138 can be set to a store-type state when the relay node 200 comprises a store-and-forward relay.

The hand-off criteria 142 comprises one or more criteria that control the occurrence of a hand-off of the WCD 150. The hand-off criteria 142 must be satisfied before the wireless access node 100 will issue a hand-off signal and initiate a hand-off of the WCD 150.

In some examples, the relay hand-off routine 131 when executed by the wireless access node 100 in general or the processing system 120 in particular operates to direct the wireless access node 100 or the processing system 120 to determine that a hand-off of the WCD 150 is imminent, if the hand-off is imminent, determine whether the WCD 150 is receiving streaming media, if the hand-off is imminent, determine whether the WCD 150 is located to hand-off to a decode-and-forward relay device 200 of the wireless network 100, and if the WCD 150 is about to hand-off to a decode-and-forward relay device and if the WCD 150 is receiving streaming media, then extend a hand-off criteria 142 in order to delay hand-off of the WCD 150 to the decode-and-forward relay device 200.

In some examples, the relay hand-off routine 131 when executed by the wireless access node 100 in general or the processing system 120 in particular operates to direct the wireless access node 100 or the processing system 120 to determine that a hand-off of the WCD 150 is imminent, if the hand-off is imminent, determine whether the WCD 150 is exchanging communications with the wireless access node according to a VOLTE communication protocol, if the hand-off is imminent, determine whether the WCD 150 is located to hand-off to a decode-and-forward relay node 200 of the wireless network 100, and if the WCD 150 is about to hand-off to a decode-and-forward relay node 200 and if the WCD 150 is exchanging communications according to the VOLTE communication protocol, then extend a hand-off criteria 142 in order to delay hand-off of the WCD 150 to the decode-and-forward relay node 200, and send a request to the decode-and-forward relay node 200 to operate in a store-and-forward relay mode.

Figure 4:
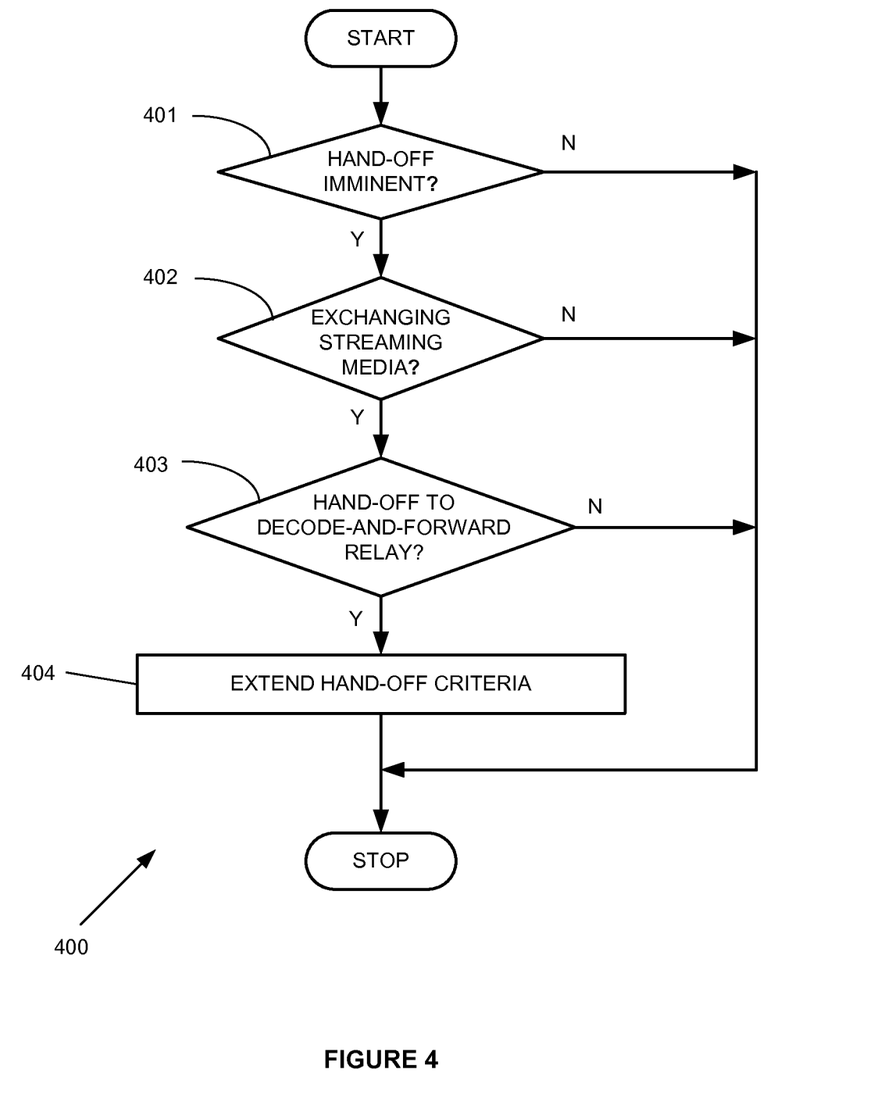
FIG. 4 is a flowchart of an exemplary hand-off method performed by a wireless access node of a wireless network to hand-off a WCD to a relay node.

FIG. 4 is a flowchart 400 of an exemplary hand-off method performed by a wireless access node of a wireless network to hand-off a WCD to a relay node. In step 401, the wireless access node determines if a hand-off is imminent, as previously discussed. If a hand-off is imminent, the method proceeds to step 402. Otherwise the method exits.

In step 402, the wireless access node determines if the WCD is exchanging streaming media with the wireless access node. If the WCD is exchanging streaming media, then the method proceeds to step 403. Otherwise, the method exits.

In step 403, the wireless access node determines whether the relay node that the WCD will be handed-off to is a decode-and-forward relay, then the method proceeds to step 404.

In step 404, the wireless access node extends a hand-off criteria to delay a hand-off of the WCD, as previously discussed.

The hand-off is delayed because if the WCD is exchanging streaming media and the relay node comprises a decode-and-forward relay, the WCD could experience increased latency and increased communication difficulties if the WCD is handed-off to a decode-and-forward relay node. The delay in hand-off may in some cases make a hand-off unnecessary, such as if the WCD 150 changes direction of travel, wherein the WCD 150 may not need to be handed-off. The delay in hand-off may in some cases enable the wireless access node to find a different target node to hand-off to, wherein the WCD may not need to hand-off to a relay node.

Figure 5:
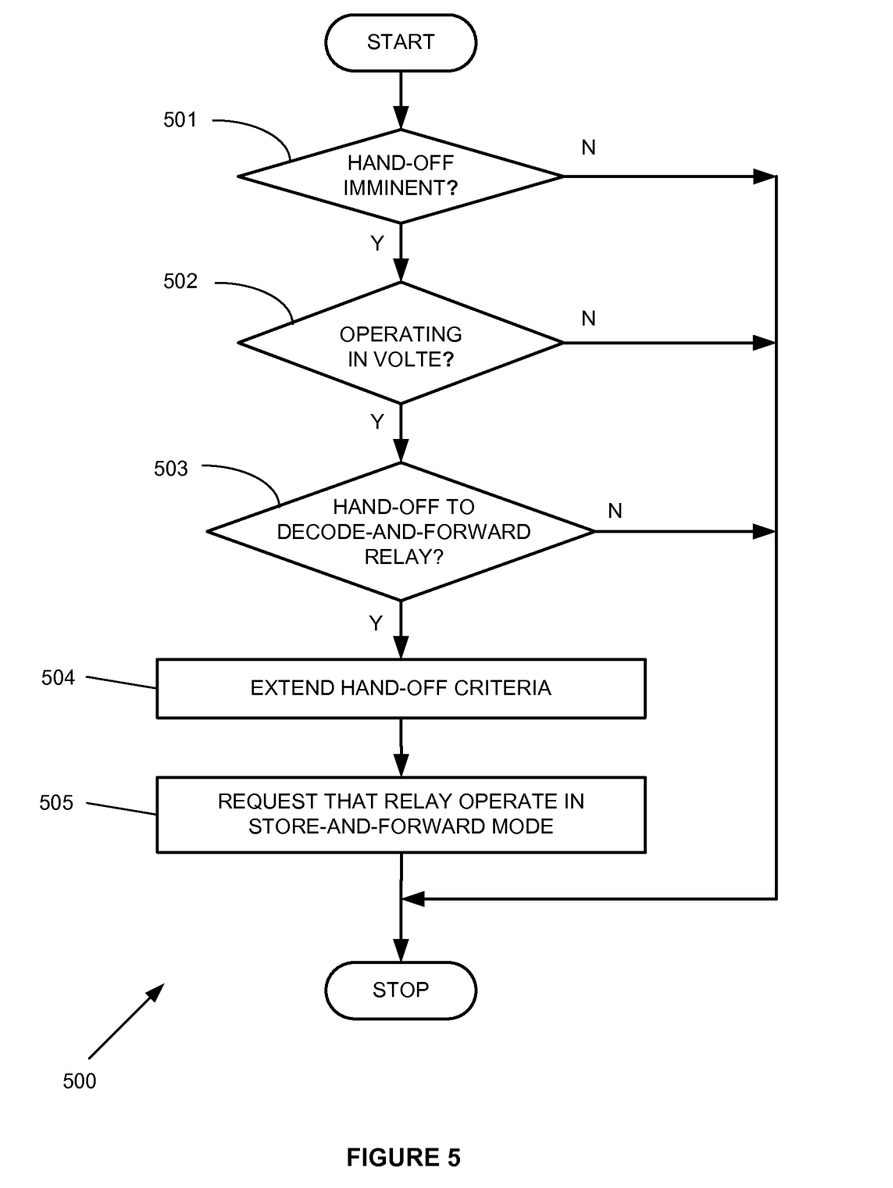
FIG. 5 is a flowchart of another exemplary hand-off method.

FIG. 5 is a flowchart 500 of another exemplary hand-off method performed by a wireless access node of a wireless network to hand-off a WCD to a relay node. In step 501, the wireless access node determines if a hand-off is imminent, as previously discussed. If a hand-off is imminent, the method proceeds to step 502. Otherwise the method exits.

In step 502, the wireless access node determines if the WCD is exchanging communications with the wireless access node according to a VOLTE communications protocol, as previously discussed. The VOLTE communications protocol comprises a specific communications protocol that is capable of conducting streaming media. If the WCD is exchanging communications according to a VOLTE communications protocol, then the method proceeds to step 503. Otherwise, the method exits.

In step 503, the wireless access node determines whether the relay node that the WCD will be handed-off to is a decode-and-forward relay, then the method proceeds to step 504. Otherwise, the method exits.

In step 504, the wireless access node extends hand-off criteria to delay a hand-off of the WCD, as previously discussed.

In step 505, the wireless access node additionally sends a request message to the relay node, requesting that the relay node operate in a store-and-forward operational mode. If the relay node can operate in a store-and-forward operational mode, then latency problems and other communication difficulties may be lessened or avoided by the WCD.

Figure 6:
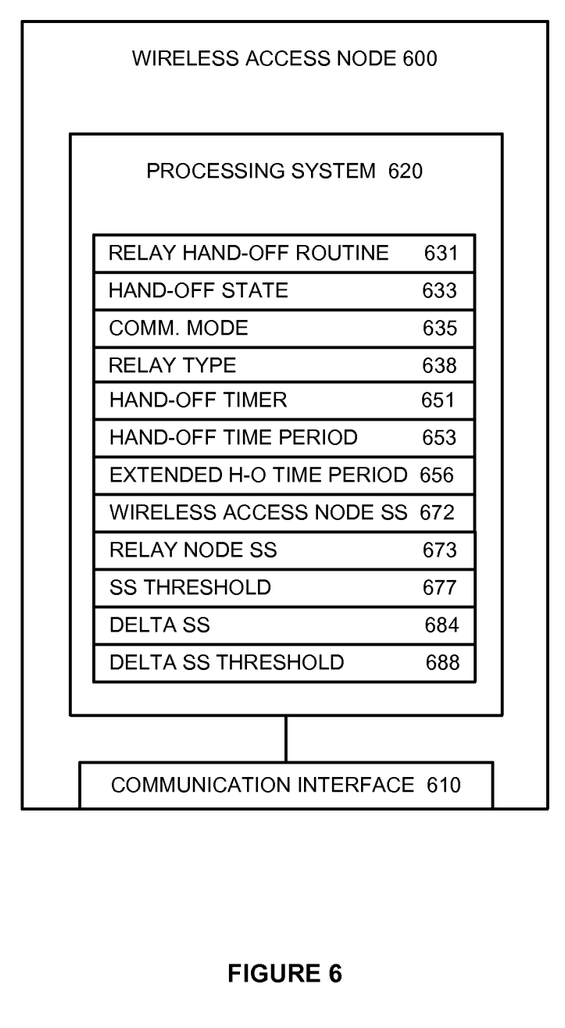
FIG. 6 shows another exemplary wireless access node.

FIG. 6 shows another exemplary wireless access node 600 configured to perform a hand-off to the relay node 200. The wireless access node 600 of FIG. 6 maybe the same as or different from the wireless access node 100 of FIG. 3. In addition to the previously discussed values, in this example the hand-off criteria 142 is replaced by a hand-off timer 651, a hand-off timer period 653, an extended hand-off time period 656, a wireless access node SS 672, a relay node SS 673, a SS threshold 677, a delta SS, and a delta SS threshold 688.

The hand-off timer 651 comprises a timer that is loaded with a predetermined delay value (i.e., the hand-off time period 653) when a hand-off is determined to be imminent. The hand-off time period 653 comprises a default timer value. When the hand-off timer 651 expires, the wireless access node 100 sends a hand-off signal to the WCD 150 and the hand-off commences. The delay generated by the hand-off time period 653 is designed to ensure that the hand-off condition is not fleeting and therefore is designed to prevent ping-ponging due to a premature hand-off.

The hand-off timer 651 can be loaded with the predetermined hand-off time period 653 when initial hand-off conditions are met. The initial hand-off conditions can include the wireless access node SS 672 dropping below the SS threshold 677 in some examples. When the wireless access node SS 672 drops below the SS threshold 677, then the wireless access node 100 sends a hand-off signal. The initial hand-off conditions can include a delta SS 684 (comprising a delta value between the wireless access node SS 672 and the relay node SS 673) exceeding a delta SS threshold 688 in other examples. When the delta SS 684 exceeds the delta SS threshold 688, then the wireless access node 100 sends a hand-off signal.

The hand-off time period 653 comprises a normal or typical hand-off delay. The hand-off time period 653 will be loaded into the hand-off timer 651 if the WCD 150 is to be handed-off to a non-relay node. The hand-off time period 653 will be loaded into the hand-off timer 651 if the WCD 150 is to be handed-off to a store-and-forward type relay node.

The extended hand-off time period 656 comprises an extended delay period. The extended hand-off time period 656 may be longer than, or much longer than, the hand-off time period 653. The extended hand-off time period 656 can be loaded into the hand-off timer 651 if the WCD 150 is to be handed-off to a decode-and-forward type relay node.

The extended hand-off time period 656 is designed to prevent handing-off too soon, wherein the WCD 150 could ping-pong between cells/nodes if the signal strength values change rapidly. This can happen when the WCD 150 moves around in the area of the cell edges and is not moving directly toward one node or the other.

The WCD 150 can measure a wireless access node signal strength (SS) of signals received from the wireless access node 100. The WCD 150 can also measure a relay node SS of signals received from the relay node 200. The WCD 150 can communicate the wireless access node SS and the relay node SS measurements to the wireless access node 100.

The wireless access node SS 672 comprises a signal strength measurement of a wireless access node signal received in the WCD 150. The wireless access node SS 672 will decrease, and may exhibit a decreasing trend, as the WCD 150 moves farther away from the wireless access node 600. The wireless access node SS 672 therefore can be used by the wireless access node 600 in a hand-off determination process. The wireless access node SS 672 can be used by the wireless access node 600 to determine that the WCD 150 should be handed-off to another node of the wireless network. The wireless access node SS 672 can be used by the wireless access node 600 to determine a time when the hand-off should be performed.

The relay node SS 673 comprises a signal strength measurement of a relay node signal received in the WCD 150. The relay node SS 673 will increase, and may exhibit an increasing trend, as the WCD 150 moves closer to the relay node 200. The relay node SS 673 therefore can be used by the wireless access node 600 in a hand-off determination process. The relay node SS 673 can be used by the wireless access node 600 to determine a hand-off target. The relay node SS 673 can be used by the wireless access node 600 to determine a time when the hand-off should be performed.

The SS threshold 677 comprises a predetermined SS threshold value that one or both of the wireless access node SS 672 and the relay node SS 673 are compared to in order to determined if a hand-off of the WCD 150 should be performed.

In one example, the SS threshold 677 is configured to be compared to the wireless access node SS 672. If the SS threshold 677 is configured for comparison to the wireless access node SS 672, then when the wireless access node SS 672 is compared to the SS threshold 677, it can be determined if the wireless access node SS 672 has decreased enough in amplitude for a hand-off to be performed. If the wireless access node SS 672 is less than the SS threshold 677, then the WCD 150 is becoming far enough away from the wireless access node 600 that communications between the wireless access node 600 and the WCD 150 will be expected to be weak and unreliable. If the wireless access node SS 672 is less than the SS threshold 677, then in some examples the wireless access node 600 can determine that a hand-off of the WCD 150 should be performed.

In another example, the SS threshold 677 is configured to be compared to the relay node SS 673. If the SS threshold 677 is configured for comparison to the relay node SS 673, then when the relay node SS 673 is compared to the SS threshold 677, it can be determined if the relay node SS 673 has increased enough in amplitude for a hand-off to be performed to the relay node 200. If the relay node SS 673 is greater than the SS threshold 677, then the WCD 150 is becoming close enough to the relay node 200 that communications between the WCD 150 and the relay node 200 will be expected to be strong and reliable. If the relay node SS 673 is greater than the SS threshold 677, then in some examples the wireless access node 600 can determine that the WCD 150 should be handed-off to the relay node 200.

In yet another example, the SS threshold 677 comprises two values and is configured to be compared to both the wireless access node SS 672 and the relay node SS 673. In this example, if the wireless access node SS 672 is less than the SS threshold 677 and if the relay node SS 673 is greater than the SS threshold 677, then it is determined that the WCD 150 should be handed-off to the relay node 200.

The delta SS 684 comprises a delta or difference between the wireless access node SS 672 and the relay node SS 673. The delta SS 684 therefore shows a difference in SS amplitude at the WCD 150 between signals from the wireless access node 600 and signals from the relay node 200. The delta SS 684 will change if one or both of the wireless access node SS 672 and the relay node SS 673 are changing. Typically, if the WCD 150 is moving away from the wireless access node 600 and toward the relay node 200, then the delta SS 684 will increase, as the wireless access node SS 672 will be decreasing and simultaneously the relay node SS 673 will be increasing.

The delta SS threshold 688 comprises a predetermined delta SS threshold value that the delta SS 684 is compared to in order to determine if a hand-off should be performed. In contrast to the SS threshold 677, for the delta SS threshold 688 the wireless access node SS 672 and the relay node SS 673 do not individually have to satisfy separate threshold values. Instead, for the delta SS threshold 688, only the difference or delta between the wireless access node SS 672 and the relay node SS 673 has to exceed a predetermined threshold. Therefore, even if the wireless access node SS 672 has not dropped below the SS threshold 677, for example, the wireless access node 600 may determine that a hand-off should be performed if the relay node SS 673 is much larger in amplitude than the wireless access node SS 672.

Referring to any of FIGS. 1, 3, and 6, the wireless access node in the examples can provide communication services including voice calls, text messages, data access, or other communication services provided over cellular or wireless communication networks. In some examples, the wireless access node includes equipment to provide wireless access and communication services to user devices within different coverage areas, to route communications between content providers and user devices, and to facilitate handoffs between equipment of different coverage areas, among other operations.

Referring to any of FIGS. 1, 3, and 6, the wireless access node comprises a LTE, LTE Advanced, or Evolved Universal Terrestrial Radio Access (EUTRA) wireless access node, or other cellular or wireless communication format, including combinations, improvements, or variations thereof.

Referring to any of FIGS. 1, 3, and 6, the wireless access node in the examples includes processing equipment, routing equipment, physical structures, and can also include transceiver equipment, antenna equipment, and other equipment. The wireless access node includes at least one transceiver and antenna for exchanging wireless communications with WCDs in a particular sector of wireless coverage. It should be understood that the wireless access node could be distributed or consolidated among equipment or circuitry that together forms the elements of the wireless access node. Further equipment, networks, and systems can be communicatively coupled to the wireless access node, such as equipment, networks, and systems of cellular voice and data communication systems, but are omitted from the figures for clarity.

The wireless access node in the examples provides one or more wireless links in a cell or cell sector of wireless coverage in some examples. The wireless access node is capable of communicating with WCDs and may be capable of communicating using a variety of frequencies and a variety of communication schemes. A wireless access node can provide one or more wireless links in some embodiments. A wireless access node can provide a cell or sector of wireless coverage in some embodiments. Any number of wireless access nodes can be included in the wireless communication environment.

Referring to any of FIGS. 1, 3, and 6, the WCD can comprise a mobile device, including a cellular phone, but also may include other devices. The WCD can comprise subscriber equipment, customer equipment, an access terminal, a smartphone, a telephone, a mobile wireless telephone, a personal digital assistant (PDA), a computer, an e-book, a mobile Internet appliance, a wireless network interface card, a media player, a game console, or some other wireless communication apparatus, including combinations thereof. The WCD may be integrated within other systems and devices, such as vehicles, appliances, apparel, and the like. The WCD detects and reports various system conditions to the wireless access node, such as inter-cell interference and failed signaling access.

The WCD can include one or more transceiver portions for communication over one or more wireless links of differing frequency bands. The WCD can receive wireless access information from one or more wireless access nodes, such as beacon signals, channel information, frequency information, overhead signaling, neighbor lists, and the like. The WCD can move among any of the coverage areas associated with the wireless communication environment and receive wireless access.

Referring to any of FIGS. 3 and 6, the communication interface in the examples comprises a network card, network interface, port, or interface circuitry that allows the wireless access node to communicate with other communication devices over a variety of networks. The communication interface may also include a memory device, software, processing circuitry, or some other device. The communication interface may use various communication protocols, such as time division multiplex, internet, Ethernet, wireless, or some other communication format—including combinations thereof—to exchange communications as described herein for communication devices, such as anonymity factor and changes to the anonymity factor and mobility data.

The communication interface in the examples comprises an interface for communicating with one or more WCDs. The communication interface receives command and control information and instructions from the processing system for controlling the operations of the communication interface and the WCDs over wireless links, coordinating handoffs of the WCDs between other wireless access systems, exchanging authentication or authorization information with other wireless access networks, providing parameters to one or more WCDs, transferring neighbor list information, and transferring communications for delivery to a WCD. The wireless link can use various protocols or communication formats as described herein, including combinations, variations, or improvements thereof.

The communication interface in the examples includes transceiver equipment for wirelessly exchanging user communications and overhead communications with user devices, omitted for clarity, using antenna arrays and the associated wireless links. The communication interface can include one or more antenna elements, RF coupling equipment, structural supports, cabling, or other equipment.

The processing system in the examples can comprise one or more microprocessors and other circuitry that retrieves and executes the relay hand-off routine. The processing system can be implemented within a single processing device but can also be distributed across multiple processing devices or sub-systems that cooperate in executing program instructions. Examples of the processing system include general purpose central processing units, application specific processors, and logic devices, as well as any other type of processing device, combinations, or variations thereof. In some examples, the processing system includes a computer readable storage media capable of storing the relay hand-off routine. The processing system can include volatile and nonvolatile, removable and non-removable media implemented in any method or technology for storage of information, such as computer readable instructions, data structures, program modules, or other data.

In addition to storage media, in the examples the processing system can also include communication media over which the relay hand-off routine can be communicated. The processing system can be implemented to include a single storage device but can also be implemented to include multiple storage devices or sub-systems co-located or distributed relative to each other. The processing system can comprise additional elements, such as a controller, capable of communicating with the storage media. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

In general, the relay hand-off routine can, when loaded into the processing system and executed, transform the processing system into a special-purpose computing system configured to perform a hand-off to a relay node, among other operations. Encoding the relay hand-off routine on the processing system can transform the physical structure of the processing system. The specific transformation of the physical structure can depend on various factors in different implementations of this description. Examples of such factors can include, but are not limited to the technology used to implement the storage media of the processing system and whether the computer-storage media are characterized as primary or secondary storage. For example, if the computer-storage media are implemented as semiconductor-based memory, the relay hand-off routine can transform the physical state of the semiconductor memory when the program is encoded therein. For example, the relay hand-off routine can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The relay hand-off routine in the examples comprises computer programs, firmware, or some other form of machine-readable processing instructions. The relay hand-off routine may include an operating system, utilities, drivers, network interfaces, applications, virtual machines, or some other type of software. The relay hand-off routine can include additional processes, programs, or components, such as operating system software, database software, or application software. The relay hand-off routine can also comprise firmware or some other form of machine-readable processing instructions executable by the processing system.

The relay hand-off routine in the examples can include additional processes, programs, or components, such as operating system software, database software, or application software. The relay hand-off routine can also comprise firmware or some other form of machine-readable processing instructions executable by the processing system.

Many aspects of the disclosure can be better understood with reference to the drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A wireless access node configured to hand-off a wireless communication device (WCD) to a relay node, comprising:
    a communication interface configured to exchange communications between the wireless access node and the WCD; and
    a processing system coupled to the communication interface and configured to determine that a hand-off of the WCD is imminent based on a delta signal strength between a wireless access node signal strength and a relay node signal strength exceeding a predetermined delta signal strength threshold, if the hand-off is imminent, determine whether the WCD is receiving one of streaming media or a Voice Over LTE (VoLTE) communication, if the hand-off is imminent, determine whether the WCD is located to hand-off to a decode-and-forward relay device of the wireless network, if the WCD is about to hand-off to a decode-and-forward relay device and if the WCD is receiving one of streaming media or a VoLTE communication, then extend a hand-off criteria in order to delay hand-off of the WCD to the decode-and-forward relay device wherein extending the hand-off comprises increasing the delta signal strength threshold, and send a request to the decode-and-forward relay device to switch over to a store-and-forward relay mode.

2. The wireless access node of claim 1, with the processing system further configured to extend the hand-off criteria by loading a hand-off timer with a predetermined extended hand-off time period.

3. The wireless access node of claim 2, with the processing system further configured to send a hand-off signal to the WCD if the hand-off timer exceeds the predetermined extended hand-off time period.

4. The wireless access node of claim 1, with the processing system further configured to send a hand-off signal to the WCD if the WCD exceeds the increased delta signal strength threshold.

5. The wireless access node of claim 1, with the processing system further configured to extend the hand-off criteria by loading a hand-off timer with a predetermined extended hand-off time period and, when the hand-off timer expires, send a request to the decode-and-forward relay node to switch over to the store-and-forward relay operational mode.

6. The wireless access node of claim 1, wherein the processing system configured to determine that the hand-off is imminent based on the delta signal strength between the wireless access node signal strength and the relay node signal strength exceeding the predetermined delta signal strength threshold is configured to determine that the hand-off is imminent based on the delta signal strength between the wireless access node signal strength and the relay node signal strength exceeding the predetermined delta signal strength threshold and a hand-off timer being initialized.

7. A hand-off method performed by a wireless access node of a wireless network to hand-off a wireless communication device (WCD) to a relay node, comprising:
    in the wireless access node, determining that a hand-off of the WCD is imminent based on a delta signal strength between a wireless access node signal strength and a relay node signal strength exceeding a predetermined delta signal strength threshold;

in the wireless access node, if the hand-off is imminent, determining whether the WCD is exchanging one of streaming media or a Voice Over LTE (VoLTE) communication with the wireless access node;

in the wireless access node, if the hand-off is imminent, determining whether the WCD is located to hand-off to a decode-and-forward relay node of the wireless network; and in the wireless access node, if the WCD is about to hand-off to a decode-and-forward relay node and if the WCD is receiving streaming media or a VoLTE communication, then extending a hand-off criteria in order to delay hand-off of the WCD to the decode-and-forward relay node wherein extending the hand-off comprises increasing the delta signal strength threshold, and sending a request to the decode-and-forward relay device to switch over to a store-and-forward relay operational mode.

8. The hand-off method of claim 7, with extending the hand-off criteria further comprising, in the wireless access node, loading a hand-off timer with a predetermined extended hand-off time period.

9. The hand-off method of claim 8, further comprising, in the wireless access node, sending a hand-off signal to the WCD if the hand-off timer exceeds the predetermined extended hand-off time period.

10. The hand-off method of claim 7, in the wireless access node, if the WCD exceeds the increased delta signal strength threshold, then sending a hand-off signal to the WCD.

11. The hand-off method of claim 7, further comprising, in the wireless access node:
   extending the hand-off criteria by loading a hand-off timer with a predetermined extended hand-off time period; and
   when the hand-off timer expires, sending a request to the decode-and-forward relay node to switch over to the store-and-forward relay operational mode.

12. The hand-off method of claim 7, wherein determining that the hand-off is imminent based on the delta signal strength between the wireless access node signal strength and the relay node signal strength exceeding the predetermined delta signal strength threshold comprises determining that the hand-off is imminent based on the delta signal strength between the wireless access node signal strength and the relay node signal strength exceeding the predetermined delta signal strength threshold and a hand-off timer being initialized.

13. A hand-off method performed by a wireless access node of a wireless network to hand-off a wireless communication device (WCD) to a relay node, comprising:
   in the wireless access node, determining that a hand-off of the WCD is imminent based on a delta signal strength between a wireless access node signal strength and a relay node signal strength exceeding a predetermined delta signal strength threshold;

in the wireless access node, if the hand-off is imminent, determining whether the WCD is exchanging communications with the wireless access node according to a Voice Over LTE (VoLTE) communication protocol;

in the wireless access node, if the hand-off is imminent, determining whether the WCD is located to hand-off to a decode-and-forward relay node of the wireless network;

in the wireless access node, if the WCD is about to hand-off to a decode-and-forward relay node and if the WCD is exchanging communications according to the VoLTE communication protocol, then extending a hand-off criteria in order to delay hand-off of the WCD to the decode-and-forward relay node wherein extending the hand-off comprises increasing the delta signal strength threshold; and sending a request to the decode-and-forward relay to operate in a store-and-forward relay mode.

14. The hand-off method of claim 13, with extending the hand-off criteria further comprising, in the wireless access node, loading a hand-off timer with a predetermined extended hand-off time period.

15. The hand-off method of claim 14, further comprising, in the wireless access node, sending a hand-off signal to the WCD if the hand-off timer exceeds the predetermined extended hand-off time period.

16. The hand-off method of claim 13, further comprising, in the wireless access node, if the WCD exceeds the increased delta signal strength threshold, then sending a hand-off signal to the WCD.

17. The hand-off method of claim 13, further comprising, in the wireless access node:
   extending the hand-off criteria by loading a hand-off timer with a predetermined extended hand-off time period; and
   when the hand-off timer expires, sending a request to the decode-and-forward relay node to switch over to the store-and-forward relay operational mode.

18. The hand-off method of claim 13, wherein determining that the hand-off is imminent based on the delta signal strength between the wireless access node signal strength and the relay node signal strength exceeding the predetermined delta signal strength threshold comprises determining that the hand-off is imminent based on the delta signal strength between the wireless access node signal strength and the relay node signal strength exceeding the predetermined delta signal strength threshold and a hand-off timer being initialized.

* * * * *